United States Patent
Herman et al.

(10) Patent No.: US 8,185,364 B2
(45) Date of Patent: May 22, 2012

(54) PROCESS AND DEVICE FOR SIMULATING A PRODUCT PRINTED BY A PRESS

(75) Inventors: Peter Q. Herman, Antony (FR); Laurent Grimaldi, Noisy-le-Grand (FR)

(73) Assignee: Sinapse Print Simulators, Saint Aubin Cedex (FR)

( * ) Notice: Subject to any disclaimer, the term of this patent is extended or adjusted under 35 U.S.C. 154(b) by 529 days.

(21) Appl. No.: 12/419,864

(22) Filed: Apr. 7, 2009

(65) Prior Publication Data

US 2009/0254322 A1    Oct. 8, 2009

Related U.S. Application Data

(60) Provisional application No. 61/043,341, filed on Apr. 8, 2008.

(30) Foreign Application Priority Data

Jul. 4, 2008    (FR) ..................... 08 54564

(51) Int. Cl.
*G06G 7/48* (2006.01)

(52) U.S. Cl. ......................................... 703/6

(58) Field of Classification Search ........ 703/6; 101/40, 101/17

See application file for complete search history.

(56) References Cited

U.S. PATENT DOCUMENTS

| | | | | |
|---|---|---|---|---|
| 4,708,911 | A * | 11/1987 | Mage ..................... | 428/542.8 |
| 6,117,061 | A * | 9/2000 | Popat et al. ............ | 493/325 |
| 2006/0037375 | A1* | 2/2006 | Betzmeier et al. ..... | 72/20.1 |
| 2006/0219119 | A1* | 10/2006 | Thoma .................. | 101/480 |
| 2007/0079711 | A1* | 4/2007 | Peters et al. .......... | 101/227 |

* cited by examiner

*Primary Examiner* — Dwin M Craig
*Assistant Examiner* — Bernard E Cothran
(74) *Attorney, Agent, or Firm* — Dickstein Shapiro LLP (57) ABSTRACT

A process and device for simulating a product printed by a virtual press. The process implemented by the device includes creation of a three-dimensional object page, selection of at least one fold among a set of predetermined folds, with the selected folds corresponding to the folds produced on the product to be simulated, for each fold produced and selected, a modification of the three-dimensional object page by the addition of at least one fold line at a given position on the three-dimensional object page, construction of the simulated product starting from the modified three-dimensional object page, and a display of the simulated product constructed in this manner.

19 Claims, 7 Drawing Sheets

16 pages

PROCESS AND DEVICE FOR SIMULATING A PRODUCT PRINTED BY A PRESS

CROSS-REFERENCE TO RELATED APPLICATIONS

This Application claims the benefit of U.S. Provisional Application 61/043,341 filed on Apr. 8, 2008, and French Patent Application No. 0,854,564 filed on Jul. 4, 2008.

FIELD OF THE INVENTION

Embodiments described herein relate generally to a process for simulating a product printed by a press and a device for implementing this process. More specifically, embodiments relate to a process that makes it possible to train a user in the use of a press for printing products such as newspapers, books, brochures, or magazines.

BACKGROUND OF THE INVENTION

A press capable of printing several thousands of pages per minute is an expensive and complex system. The slightest error in usage of a press is highly detrimental, since a halt in the operation of the press for several seconds or minutes represents a large financial loss. Training in the use of such presses is thus very important, so as to limit the errors committed by the user insofar as possible, and to learn how to correct any problem that can occur in a press during operation. However, this training can proceed with difficulty on a press being used, because the use of a press by a novice in the course of being trained increases the risk of operational errors.

Printer simulators used at the end of the training process have existed now for more than 18 years. The first of the simulators, built in 1990 by the Sinapse Company, was the "SIR Offset" printing simulator. This operated in the MS-DOS environment on personal computers (PCs) of that time, supplemented by a double-screen graphics card. The press modeled here corresponded to the minimally acceptable press used at the end of the training process. This press included only one band, and the only product type modeled corresponded to a section of 16 pages. This configuration was completely sufficient and satisfactory for training in rotary printers. It corresponded to the "standard" press of the field, and satisfied the majority of users' needs at that time.

However, the disadvantage of this "SIR Offset" simulator is that it does not reflect the complexity and diversity of current presses. The object of this invention is to be able to simulate a press in a more realistic and complete manner.

BRIEF SUMMARY OF THE INVENTION

A process for simulating a product printed by a press comprises creating a three-dimensional object page, and selecting of at least one fold among a set of predetermined folds, with the selected folds corresponding to the folds produced by the press on the product to be simulated, for each fold selected, modifying of the three-dimensional object page by the addition of at least one fold line at a given position on the three-dimensional object page. The process includes constructing the simulated product starting from the three-dimensional object page modified in this manner, and displaying the simulated product on a display device.

The selection consists preferentially of a selection of one or a plurality of folds from among a larger number of folds that can be made by the press. Thus, the invention makes it possible to simulate the current presses in a more realistic manner, in which it becomes increasingly frequent to produce various products by changing the folds of the folding machine of this press for the same usage site. Since the folds selected correspond to the folds produced, the two can be referred to in an equivalent manner.

The process can also include providing a sequence of folds produced. For one of the selected and produced folds, the modification of the three-dimensional object page depends preferentially on an order of the fold within the sequence of folds. For the fold, a number of fold lines to be added to the three-dimensional object page, and/or the position of these fold lines on the three-dimensional object page, and/or a folding direction about a folding line, can depend on the order of this fold within the sequence of folds.

For the selection of at least one fold, the process can include providing a number of folds produced on the product and a fold type for each of these folds produced. For each of the folds produced a number of fold lines to be added to the three-dimensional object page, and/or the position of these fold lines on the three-dimensional object page, and/or for each fold line, a folding direction about this line, can depend on the type of this fold produced.

The process can moreover include providing folding fault parameters related to each of the folds produced, and a modification of the position of each of the fold lines of the three-dimensional object page as a function of these folding fault parameters. The folding fault parameters can include for at least one fold line parameter for shifting by translation this at least one line with respect to an optimal transverse or longitudinal position of this at least one line and/or parameters for shifting by rotation this at least one line with respect to an optimal angular position of this at least one line.

The process can moreover include adding dog-ear lines at each corner of the three-dimensional object page and/or of each junction between the fold lines and the edges of the three-dimensional object page, and/or of each junction between the fold lines.

The three-dimensional object page preferably includes two faces, the process preferably including a coating of an image associated with this face. The process according to the invention can moreover include integrating of texture faults of the product due to the folds produced, the texture faults being combined with the images before their coating on the faces of the three-dimensional object.

The display can include providing a point of view for displaying the product, said point of view preferably corresponding to the front or reverse side of the product. The display can include providing a choice of folds to display among the folds produced.

According to another embodiment of the invention, a device for simulating a product printed by a press is proposed. The device includes a press console for controlling the press, a processor configured to simulate the press, the processor configured to create a three-dimensional object page, select at least one fold among a set of predetermined folds, with the selected folds corresponding to the folds produced by the press on the product to be simulated, and modify the three-dimensional object page by adding at least one fold line at a given position on the three-dimensional object page for each fold produced and selected, and construct the simulated product from the modified three-dimensional object page, and a display device that displays the simulated product constructed in this manner.

According to yet another embodiment of the invention, a device for simulating a product printed by a press is proposed, implementing the process according to the invention, including a press console to control the press, means for simulating the press, characterized in that it moreover includes: means for creating a three-dimensional object page, means of selecting at least one fold among a set of predetermined folds, with the selected folds corresponding to the folds produced by the press on the product to be simulated, means for modifying the three-dimensional object page by the addition of at least one fold line at a given position on the three-dimensional object page for each fold produced and selected, means for constructing the simulated product from the three-dimensional object page modified by the means of modification, and means for displaying the simulated product constructed in this manner.

The selection means are preferably arranged to select one or a plurality of folds from among a larger number of folds that can be made by the press.

The device can moreover include means for providing a sequence of folds produced to the means of modification and/or to the means of selection. For one of the selected and produced folds, the means of modification can be arranged to carry out a modification of the three-dimensional object page that depends on an order of this fold within the sequence of folds. For this fold: a number of fold lines to be added to the three-dimensional object page, and/or the position of these fold lines on the three-dimensional object page, and/or for each fold line, a folding direction about this line, can depend on the order of this fold within the sequence of folds.

The device can include means for providing a number of folds produced on the product and/or a type of fold for each of the folds produced to the means of modification and/or to the means of selection. For each of the folds produced: a number of fold lines to be added to the three-dimensional object page, and/or the position of these fold lines on the three-dimensional object page, and/or for each fold line, a folding direction about this line, can depend on the type of this fold produced.

The device can moreover include means for providing folding fault parameters to the means of modification and/or to the means of selection connected to each of the folds produced, and the means of modification being arranged to modify the position of each of the fold lines of the three-dimensional object page as a function of these folding fault parameters. For at least one fold line the folding fault parameters can include parameters for shifting this at least one line by translation with respect to an optimal transverse or longitudinal position of this at least one line, and/or parameters for shifting this at least one line by rotation with respect to an optimal angular position of this at least one line.

The device can moreover include means for adding dog-ear lines at each corner of the three-dimensional object page, and/or for each junction between the fold lines and the edges of the three-dimensional object page, and/or for each junction between the fold lines.

The three-dimensional object page moreover preferably includes two faces, and the device also preferably includes means for coating on each face an image associated with this face. The device according to the invention can moreover include means for integrating texture faults of the product due to the folds produced, and means for combining the texture faults with the images before their coating on the faces of the three-dimensional object.

The device can moreover include means for providing a point of view for displaying the product to the display means, said point of view preferably corresponding to the front or reverse side of the product. The device according to the invention can moreover include means for providing a choice of folds among the folds produced to be displayed on the display means.

Additional advantages and features of the invention will become apparent upon reading the detailed description of the implementation and embodiments, which are not limiting, and the attached drawings.

DETAILED DESCRIPTION OF THE INVENTION

Embodiments described herein address the problems with current processes and devices for simulating products printed by a press. The following are example embodiments. It should be understood that embodiments of the invention are not limited by the example embodiments and that changes can be made thereto.

Figure 1:
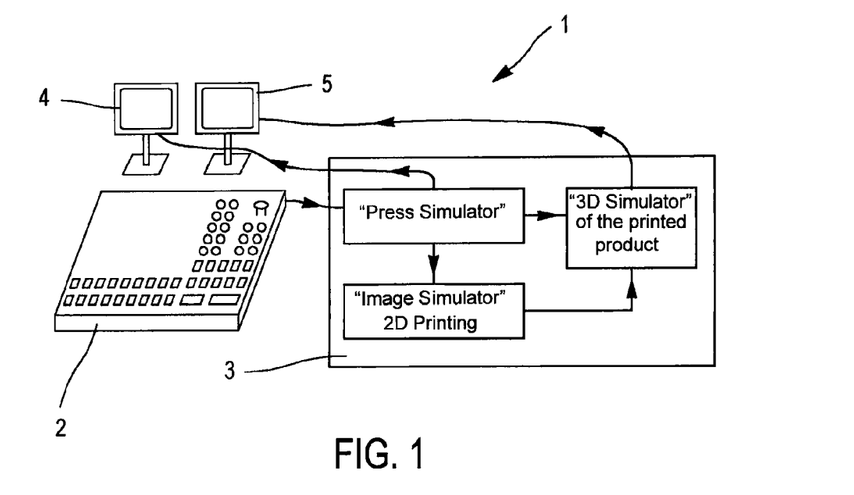
FIG. 1 schematically shows a preferred embodiment device according to the invention, implementing a preferred embodiment of the process according to the invention.

An example device 1 is first described with reference to FIG. 1. The device 1 comprises a control console 2 for a press, a unit 3 for calculating and data processing, and two monitors 4, 5.

Console 2 is a non-virtual console, that is, an actual console that can be used to control a press on a usage site. It is shown as a large board with numerous control buttons for the press (to regulate the speed of rotation of the press, to regulate the ink dosage, emergency stop button, etc.) as well as indicators for monitoring the state of the press. The press is not physically present in the device 1, but is a virtual press simulated by unit 3.

Unit 3 typically comprises a central processor of a computer equipped with a double-screen graphics card for the monitors 4, 5 and software means, or typically comprises a microprocessor or an analog or dedicated digital electronic circuit to carry out the steps of the process according to the invention. Unit 3 is in particular configured for simulating a state of the virtual press controlled by the console 2, sending simulation data on the state of the press to the control monitor in order to display them, simulating two-dimensional images printed by the press on an object produced by the press, said object consequently being called a product, simulating this product in three dimensions, and in particular simulating the folds produced by the press on the product, and sending the three-dimensional simulation data for the product to the production follow-up monitor 5 to be displayed on the monitor 5. The product is a rectangular piece of paper having two surfaces, front and reverse. Consequently, the term product or sheet will be used equivalently.

Figure 2:
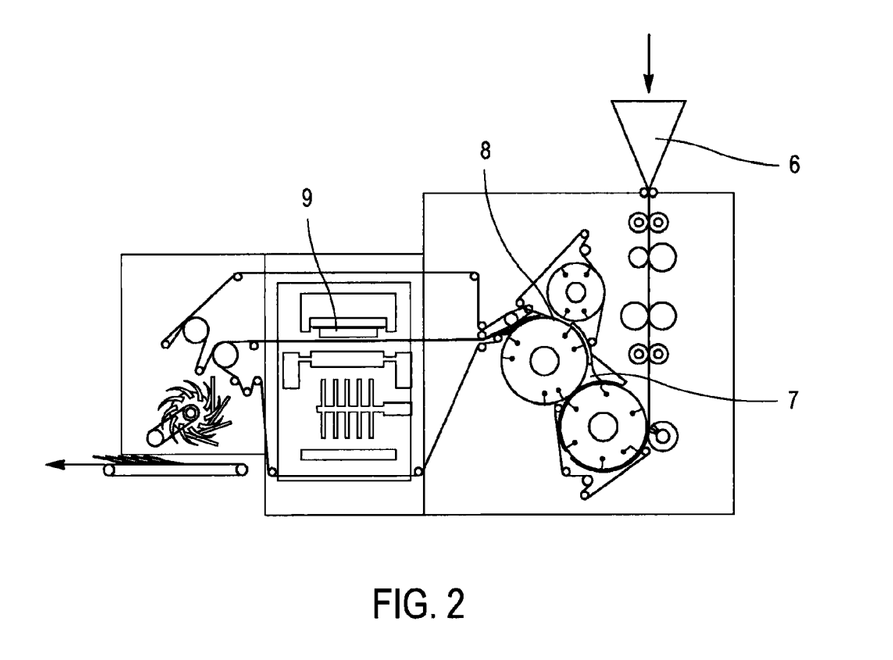
FIG. 2 schematically shows a folding machine modeled by an embodiment of the process.

With reference to FIG. 2, the steps of simulating the press according to the an example procedure implemented by unit 3 is now described. The simulation of the press includes hierarchical structural modeling of all the components constituting the virtual press, and functional modeling of the virtual press.

The components of the press include a tape winder, a band guide, an infeed, a printing group for ink printing, a drier, a cooler, and a folding machine. In the structural modeling, each of these components is described only once, even if several instances of a component are actually present in the press (for example, the press typically comprises several printing groups, i.e., a printing group for each elementary color, black, cyan, magenta, and yellow). The level of modeling of each component is determined in relation to pedagogical objectives. This level of modeling directly determines the level of description of each of the components. This modeling of each of the components describes all the attributes necessary for the simulation. Each attribute of a component describes an aspect of it, and allows it to be defined as a function of contextual parameters including: interactions with other components of the structural model; a range of possible values (minimum, maximum, units); a range of reference values (no failure tolerance zone); and a range of malfunction values and the associated failures.

In order to elaborate on the functional modeling of the press, the virtual press is constructed by combining the components described in the hierarchical structural model, by possibly defining a plurality of instances of actual components present and by specifying the values of their contextual parameters.

Modeling of a folding machine in a process according to the invention allows the simulation of the following types of folds: longitudinal folds made along the length of the product, along at least one fold line parallel to an unwinding direction of the product in the press, these folds including the conical fold and the square fold, and transverse folds made along the width of the product along at least one fold line perpendicular to the unwinding direction of the product in the press, these folds including the first parallel fold, the second parallel fold, and the delta fold.

Unit 3 models the folding machine shown in FIG. 2. The location of mechanical elements forming the different folds is as follows: the conical fold is formed in a cone 6 situated at the entrance of the folding machine and folds the product into two equal parts along its length; the first parallel fold is formed downstream of cone 6 with respect to the unwinding direction of the product, by means of a mechanism 7 including a blade penetrating into a grip and folding the product into two parts equal in width; the second parallel fold is formed downstream of cone 6 and the mechanism 7 with respect to the unwinding direction of the product, by means of a mechanism 8 situated between two rollers and folding the product into two parts equal in width; the delta fold is formed by the combined application of mechanisms 7 and 8, and folds the product into three equal parts equal in width; the square fold is formed downstream of the cone 6 and mechanisms 7, 8 with respect to the unwinding direction of the product, by means of a vertical blade 9 that folds the product in two along its length. The folds are multiplicative between themselves. For example, in forming a conical fold then a square fold, the product is folded in two along its length, then refolded in two along its length, resulting in a total fold into four equal parts along its length.

The presence and sequence of all these types of folds is not fixed, but can be modified, and depends on the functional definition of the press. The folding machine is configured to respond to a selected type of product. Thanks to the modeling of these 5 folds and their combination, unit 3 is capable of simulating different products, in particular the following six products: (1) a product on which a sequence of two folds is formed including a conical fold followed by a first parallel fold by means of successive orders; (2) a product on which a sequence of three folds is formed including a conical fold followed by a first parallel fold then a square fold by means of successive orders; (3) a product on which a sequence of three folds is formed including a conical fold followed by a first parallel fold then a square fold by means of successive orders; (4) a product on which a sequence of four folds is formed including a conical fold followed by a first parallel fold then a second parallel fold then a square fold by means of successive orders; (5) a product on which a sequence of two folds is formed including a conical fold followed by a delta fold by means of successive orders; and (6) a product on which a sequence of three folds is formed including a conical fold followed by a delta fold then a square fold by means of successive orders.

The variability of simulated products is also explained by the size of the product and by the nature of the paper bands used. The process according to the invention includes control of the virtual press by means of console 2.

The operation of unit 3 will now be described with reference to FIGS. 3 through 15. Unit 3 primarily implements three applications: (1) a simulation application of the press for the structural modeling and functional modeling described previously, this application consequently being called a "press simulator;" (2) s simulation application for two-dimensional images printed by the press on the product, this application consequently being called an "image simulator;" and (3) a simulation application in three dimensions of this product, in particular for simulating the folds produced by the press on the product and for displaying the product, this application consequently being called a "3D simulator." The process according to the invention includes a simulation of the press by unit 3 and by the "press simulator."

The "3D simulator" is a specific application developed in Visual C++ that operates in the WINDOWS operating system environment, and uses an application programming interface (or API) to achieve three-dimensional modeling of an object for simulation and rendering of objects in three dimensions. The API used is the multi-platform OpenGL ("Open Graphic Library") API. An objective of this application is the display of the finished product and its faults in three dimensions in order to facilitate the perception of the structure of the product by the user, and to offer the possibility of opening each fold, just as with a real object, in order to analyze their achievement.

At each impression of a copy of the product by the virtual press, a new display of the product is calculated by the "3D simulator" as a function of all the press parameters that concern the adjustments of the console 2 and the adjustments of the state of the press (notably the adjustments defining the folds produced on the product) and which are dynamically furnished to the "3D simulator" by the "press simulator."

Figure 3:
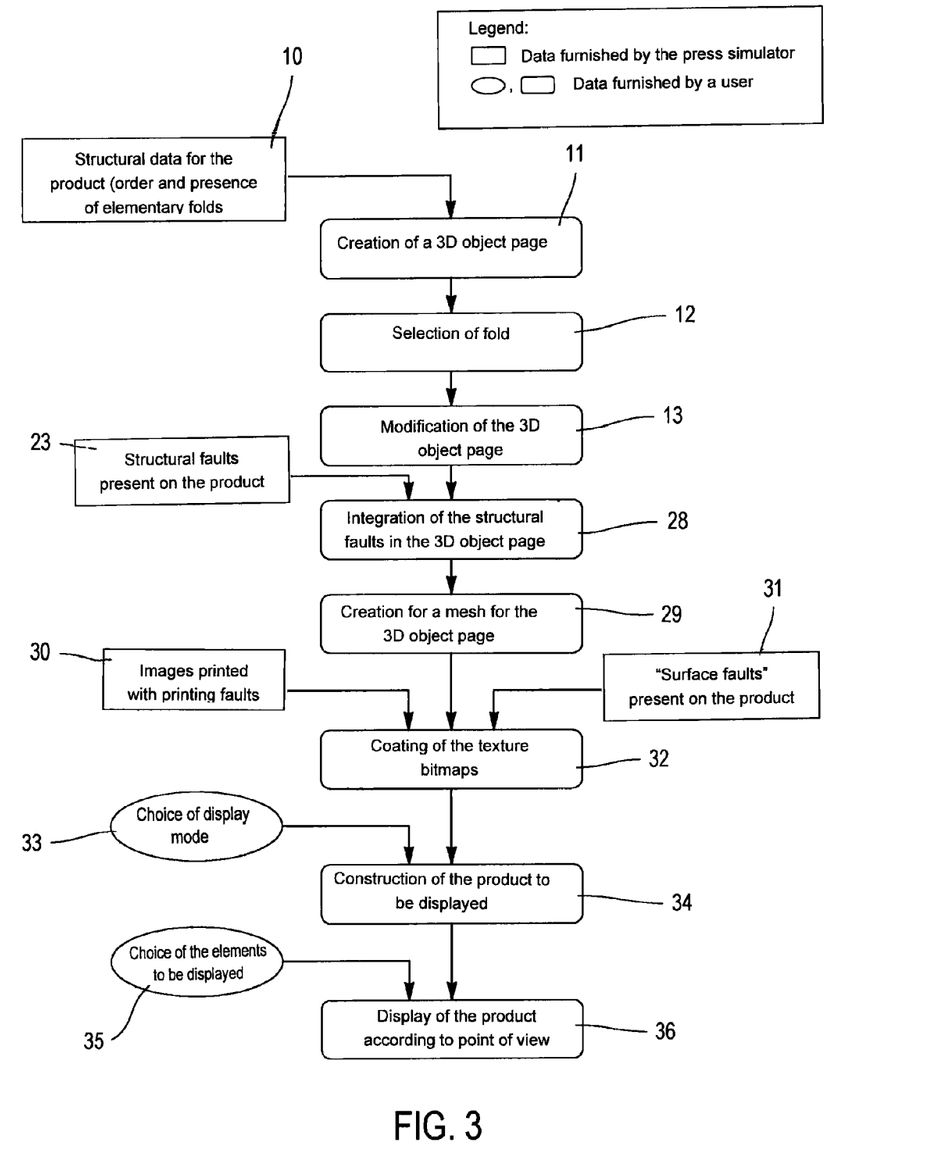
FIG. 3 is a flowchart showing the steps of an embodiment of the process.

FIG. 3 is a flowchart showing the principal steps 10 to 13, 23, and 28 to 36 of the process according to the invention implemented by unit 3 and the "3D simulator." At each impression of a copy the steps of this flowchart are carried out integrally.

The process according to the invention includes first receiving 10 of data (through the "3D simulator") with data concerning the structure of the sheet product. These structural data are generated then furnished by the "press simulator" and include: the width of the unfolded sheet; the length of the unfolded sheet; a number of folds produced on the sheet by the folding machine of the virtual press; for each of the folds produced, the type of this fold, and a sequence of the folds produced on the sheet by the folding machine of the virtual press.

Then the process according to the invention includes creating 11 of a three-dimensional object page corresponding to the sheet product to be simulated. The three-dimensional object page is a modeling file of a three-dimensional object. This file is of the OpenGL type. Before any modification, the three-dimensional object page simulates the sheet in the form of a planar and rectangular object having two faces, namely front and reverse.

The process moreover includes selecting 12 of at least one fold from among an ensemble of predetermined folds stored in a fold library. The folds selected correspond to those formed on the product by the virtual press according to the adjustments of the virtual press. This selection is performed as a function of the structural data furnished by the "press simulator."

In this document a fold is defined in particular by its type and its order in a sequence of folds. The fold library (i.e., the ensemble of predetermined folds) includes a number of folds larger than the number of folds produced and selected. Typically, the library includes a fold file for each predetermined fold that can be simulated by the "press simulator" and can be selected. The files include: a file of conical folds for a conical fold produced in the first position within a sequence of folds; a file of first parallel folds for a first parallel fold formed in the second position within a sequence of folds following a conical fold; a file of delta folds for a delta fold formed in the second position within a sequence of folds following a conical fold; a second parallel fold file for a second parallel fold formed in the third position within a sequence of folds following a conical fold then a first parallel fold; a square fold file for a square fold formed in the third position within a sequence of folds following a conical fold then a first parallel fold; another square fold file for a square fold formed in the third position within a sequence of folds following a conical fold then a first delta fold; and still another square fold file for a square fold formed in the fourth position within a sequence of folds following a conical fold then a first parallel fold and then a second parallel fold. Each fold file includes data relative to the modifications associated with this fold file, including a number of fold lines to be added to the three-dimensional object page, the position of these fold lines on the three-dimensional object page, and for each fold line, a folding direction about this line.

Following steps 10, 11, and 12, the process according to the invention includes a modification 13 of the three-dimensional object page for each fold selected by adding to it at least one fold line to a given position on the three-dimensional object page.

These modifications are carried out in the following manner. The fold files corresponding to the folds selected are invoked or loaded dynamically by unit 3 according to a sequence corresponding to the sequence of folds produced. At each invocation or loading of a fold file, the "3D simulator" applies the modifications associated with this file to the three-dimensional object page, in other words, it adds the fold lines associated with this fold file on the three-dimensional object page, with their position and their folding direction.

Figure 4:
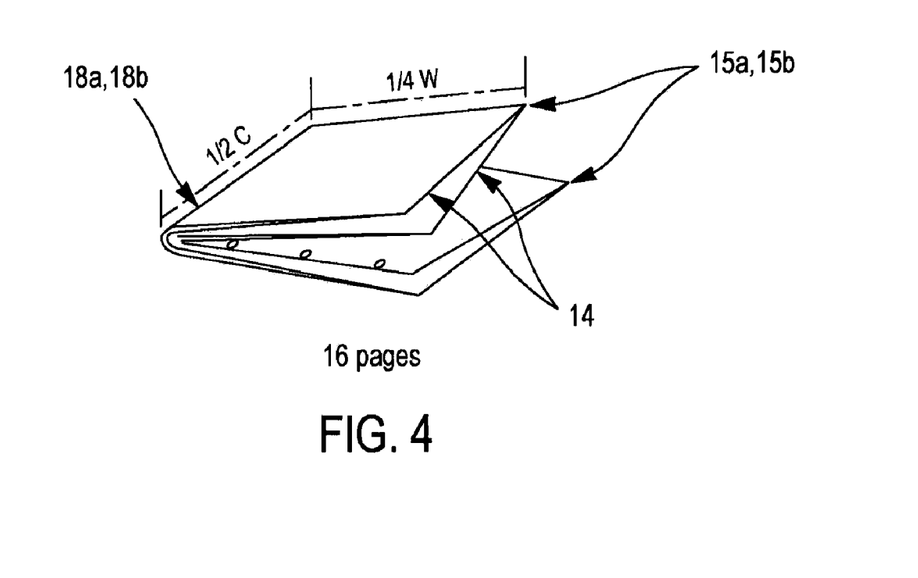
FIG. 4 shows a first sequence of folds simulated by an embodiment of the process.
Figure 5:
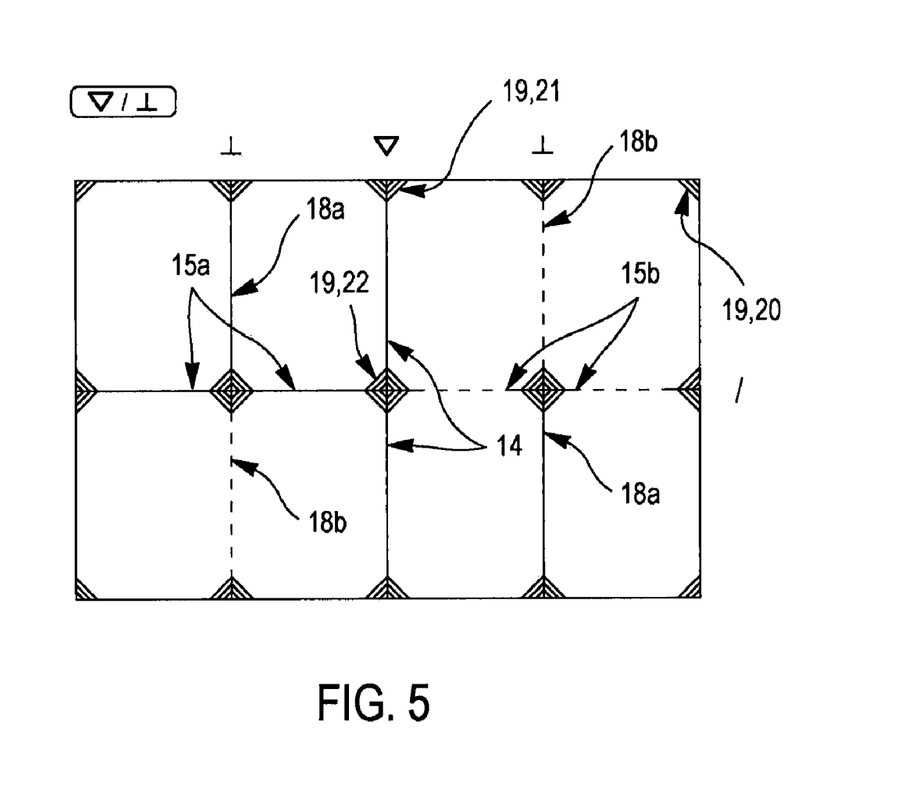
FIG. 5 shows a first three-dimensional object page constructed and modified by an embodiment of the process for the first sequence of folds of FIG. 4.

FIG. 4 shows the product folded according to a sequence including a conical fold followed by a first parallel fold then a square fold by means of successive orders. FIG. 5 shows the three-dimensional object page formed and modified in order to model this product. For this product, the "3D simulator" loads the conical fold file for a conical fold formed in the first position within a sequence of folds, then adds to the three-dimensional object page a fold line 14 positioned in the middle of the length of this object page along with a first folding direction, and then loads the file for the first parallel fold for a first parallel fold formed in the second position within a sequence of folds following a conical fold, and then adds two fold lines 15a and 15b to the three-dimensional object page in the middle of the width of this object page, a line 15a having the first folding direction and the other line 15b having a second folding direction. the simulator then loads the square fold file for a square fold formed in the third position within a sequence of folds following a conical fold then a first parallel fold, then adds four fold lines 18a and 18b to the three-dimensional object page, one of the lines 18a and one of the lines 18b being positioned at quarter of the length of this object page, one of the lines 18a and 18b being positioned at three quarters of the length of this object page, the two lines 18a having the first folding direction and the other two lines 18b having the second folding direction.

Figure 6:
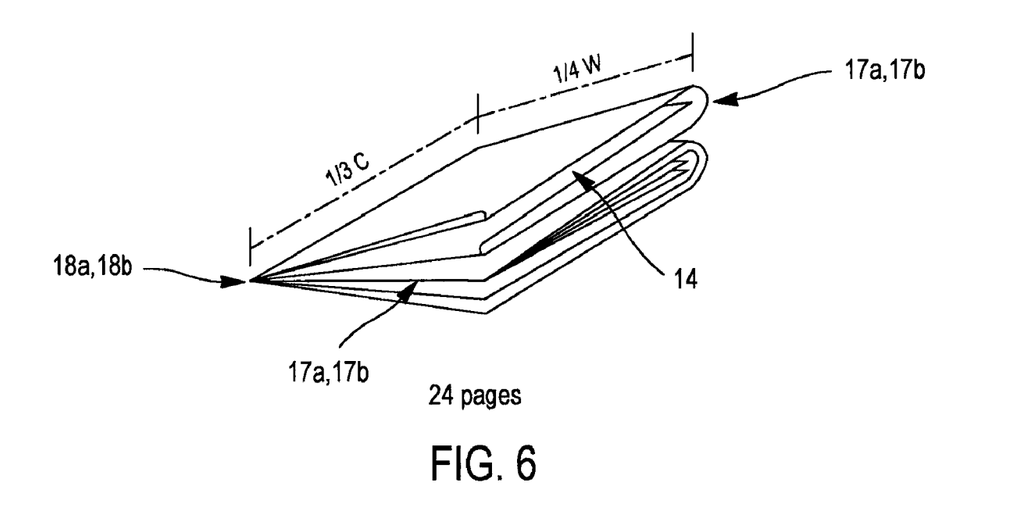
FIG. 6 shows a second sequence of folds simulated by an embodiment of the process.
Figure 7:
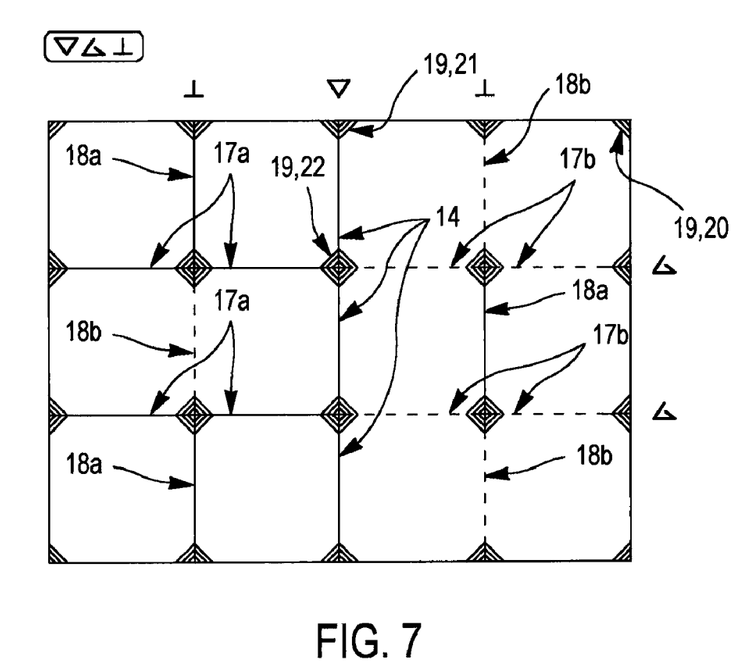
FIG. 7 shows a second three-dimensional object page constructed and modified by an embodiment of the process for the second sequence of folds of FIG. 6.

FIG. 6 shows the product folded according to a sequence including a conical fold then a delta fold and then a square fold by means of successive orders. FIG. 7 shows the three-dimensional object page formed and modified in order to model this product. For this product, the "3D simulator" loads the conical fold file for a conical fold formed in the first position within a sequence of folds, then adds to the three-dimensional object page the fold line 14 positioned in the middle of the length of this object page and with the first folding direction, and then loads the delta fold file for a delta fold formed in the second position within a sequence of folds following a conical fold, then adds to the three-dimensional object page four fold lines 17a and 17b, one of the lines 17a and one of the lines 17b being positioned at a third of the width of this object page, one of the lines 17a and 17b being positioned at two thirds of the width of this object page, the two lines 17a having the first folding direction and the other two lines 17b having the second folding direction. The simulator then loads the square fold file for a square fold formed in the third position within a sequence of folds following a conical fold then a delta fold, then adds six fold lines 18a and 18b to the three-dimensional object page, two of the lines 18a and one of the lines 18b being positioned at a quarter of the length of this object page, one of the lines 18a and two of the lines 18b being positioned at three quarters of the length of this object page, the three lines 18a having the first folding direction and the other three lines 18b having the second folding direction.

Figure 8:
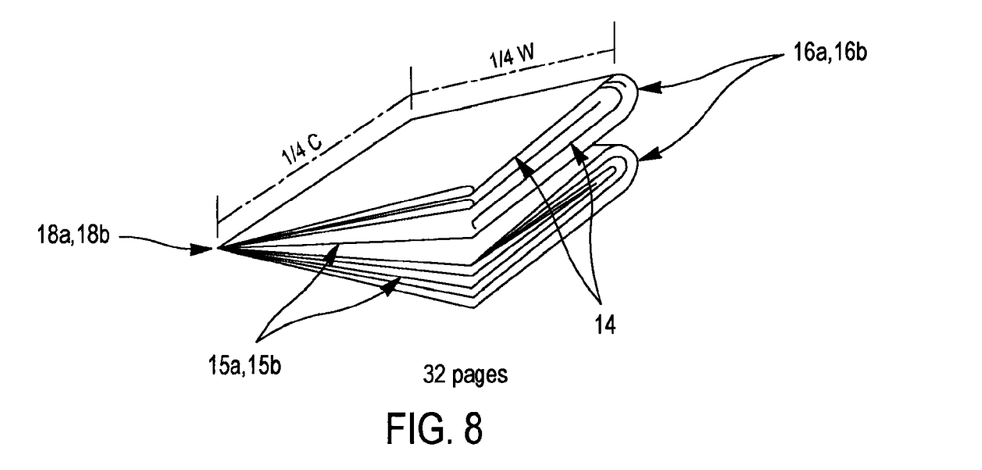
FIG. 8 shows a third sequence of folds simulated by an embodiment of the process.
Figure 9:
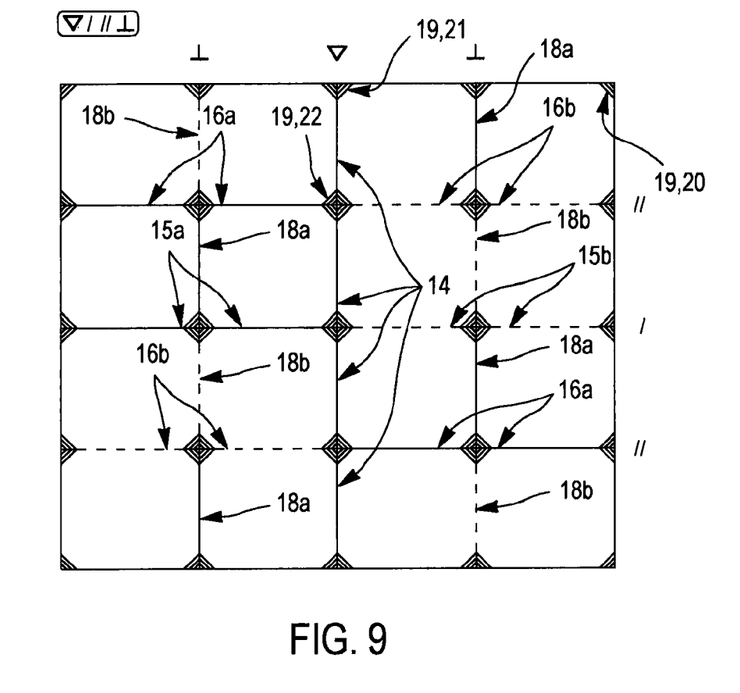
FIG. 9 shows a third three-dimensional object page constructed and modified by an embodiment of the process for the third sequence of folds of FIG. 8.

FIG. 8 shows the product folded according to a sequence including a conical fold followed by a first parallel fold then a second parallel fold then a square fold by means of successive orders. FIG. 9 shows the three-dimensional object page formed and modified in order to model this product. For this product, the "3D simulator" loads the conical fold file for a conical fold formed in the first position within a sequence of folds, then adds to the three-dimensional object page the fold line 14 positioned in the middle of the length of this object page and with the first folding direction, and then loads the file for the first parallel fold for a first parallel fold formed in the second position within a sequence of folds following a conical fold, and then adds two fold lines 15a and 15b to the three-dimensional object page positioned in the middle of the width of this object page, a line 15a having the first folding direction and the other line 15b having a second folding direction. The simulator then loads the second parallel fold file for a second parallel fold formed in the third position within a sequence of folds following a conical fold then a first parallel fold, then adds four fold lines 16a and 16b to the three-dimensional object page, one of the lines 16a and one of the lines 16b being positioned at quarter of the length of this object page, one of the lines 16a and 16b being positioned at three quarters of the length of this object page, the two lines 16a having the first folding direction and the other two lines 16b having the second folding direction, and then loads the square fold file for a square fold formed in the fourth position within a sequence of folds following a conical fold then a first parallel fold then a second parallel fold, then adds eight fold lines 18a and 18b to the three-dimensional object page, two of the lines 18a and two of the lines 18b being positioned at quarter of the length of this object page, two of the lines 18a and two of the lines 18b being positioned at three quarters of the length of this object page, the four lines 18a having the first folding direction and the other four lines 18b having the second folding direction.

In FIGS. 5, 7, and 9, the fold lines 14, 15a, 16a, 17a, 18a folding according to the first folding direction are represented by solid lines. By definition, a fold line having the first folding direction forms a convex angle during its folding for a viewer looking at FIGS. 5, 7, and 9.

In FIGS. 5, 7, and 9, the fold lines 15b, 16b, 17b, 18b, folding according to the second folding direction are represented by dotted lines. By definition, a fold line having the first folding direction forms a convex angle during its folding for a viewer looking at FIGS. 5, 7, and 9.

With reference to FIGS. 4 to 9, it is noted that the modification carried out on the three-dimensional object page for a fold produced depends on the type of fold produced. In particular, the following elements depend on the type of the fold produced: a number of fold lines to be added to the three-dimensional object page; the position of these fold lines on the three-dimensional object page, and for each fold line, and a folding direction about this line.

Moreover, it is noted that for the square fold the modification carried out on the three-dimensional object page for a fold produced depends on an order of this fold within the sequence of the folds produced. In particular, the following elements depend on the order of the square fold within the sequence of folds: a number of fold lines to be added to the three-dimensional object page; the position of these fold lines on the three-dimensional object page; and for each fold line, a folding direction about this line. This dependence is taken into account by the existence of different square fold files.

The process according to an embodiment includes an integration 28 of one or more structural faults in the three-dimensional object page. The structural faults include fold faults and/or dog-ear faults. The process according to an embodiment includes reception 23 by the "3D simulator" of dog-ear fault parameters furnished by the "press simulator." These dog-ear fault parameters describe the structural faults of the product, and more precisely describe the number, position, and extent of dog-ears formed in error on the product by the virtual press. These parameters are caused by the "press simulator." Dog-earing of a corner of the product can occur when it is unfolded or when it is folded partially or totally according to the sequence of the folds produced. Thus, following the modifications 13, the process according to the invention moreover includes an integration 28 of the dog-ear faults as a function of these dog-ear parameters, including addition of new fold lines called dog-ear lines 19 and located at each corner 20 of the three-dimensional object page, for each junction 21 between the fold lines 14, 15a, 15b, 16a, 16b, 17a, 17b, 18a and 18b on the one hand, and on the other hand the exterior edges of the three-dimensional object page, and for each junction 22 between the fold lines 14, 15a, 15b, 16a, 16b, 17a, 17b, 18a and 18b. The dog-ear lines include a plurality of concentric lines surrounding these corners and junctions.

Figure 10:
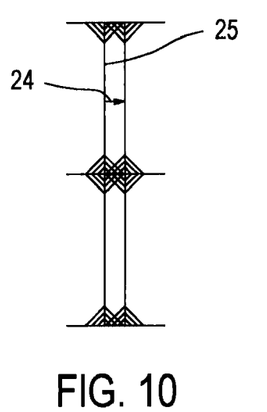
FIG. 10 through FIG. 12 show different fold faults simulated by an embodiment of the process.
Figure 11:
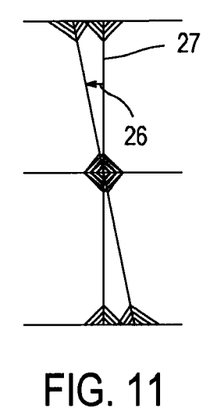
Figure 12:
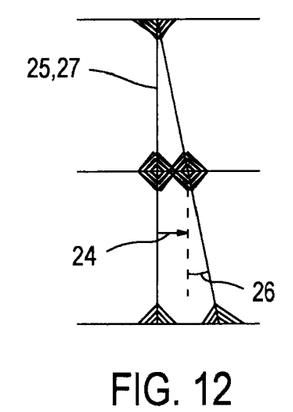

After the steps 10 to 13, the process according to the invention moreover includes reception 23 by the "3D simulator" of folding fault parameters furnished by the "press simulator." These parameters are caused by the "press simulator." With reference to FIGS. 10 to 12, these folding fault parameters describe structural faults related to each of the folds produced, such as, for example, a translational shift 24 of at least one fold line with respect to an optimal transverse or longitudinal position 25 of this at least one line, and/or a rotational shift 26 of this at least one line with respect to an optimal angular position 27 of this at least one line.

After the steps 10 to 13 and 23, the process moreover includes integration 28 of the fold faults in the three-dimensional object page by the "3D simulator." In order to integrate these parameters, the "3D simulator" modifies the object page by applying to it the faults described by the folding fault parameters, notably the translational shifts and/or rotational shifts.

Figure 13:
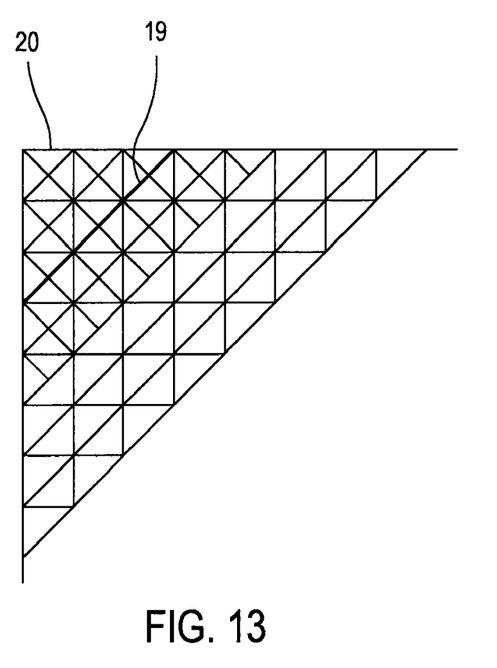
FIG. 13 shows a part of a mesh constructed by an embodiment of the process for a three-dimensional object page.

The folds are formed sequentially one after the other, the following fold applied to the result of the preceding one. The potential faults of each of the folds accumulate and combine from one to the others. The dog-ear and folding fault parameters have a direct impact on the structure and mesh of the simulated product in three dimensions. Thus, it is only after steps 10 à 13, 23 and 28 that the "3D simulator" generates a creation 29 of a triangular mesh of the three-dimensional object page. This mesh decomposes the object page into a multitude of triangles that run along the exterior edges of the object page and all the fold lines of the folds produced and the dog-ears. This mesh is not shown in FIGS. 5, 7, and 9 so as not to overburden them. FIG. 13 shows this mesh in the proximity of one of the corners 20 of the object page. The density of the triangular mesh is not uniform, and is higher when it approaches the corners and junctions 21, 22.

Once steps 10 to 13, 23, 28 and 29 are completed, it is necessary to add images corresponding to the finished printed product to the object page. The "image simulator" receives parameters describing the printing of the product from the "press simulator", calculates the finished product with its printing faults, if any, and then generates a 1024×1024 pixel bitmap file called the face image for each face of the product (front and reverse) that will be used by the "3D simulator" as the texture bitmap of the object page. The face images represent what is printed on each of the faces of the product when a copy of the product is printed. The face images include printing faults calculated by the "image simulator," and are generated for each impression of the product. Among the printing faults it is possible, for example, to cite problems of color dosage, problems of positions with respect to pixels of elementary colors, problems with dry zones, of lighter or darker bands, etc. The process according to the invention includes reception 30 by the "3D simulator" of face images furnished by the "image simulator." These face images correspond to a display after printing but before folding the product. Faults related to the folding machine and the folds are not integrated into these images. These bitmaps are dynamic, because they are regenerated at each impression of a copy of the product.

Certain texture faults that are produced in the folding machine do not appear on the structure of the product and object page. Following the steps 10 to 13, 23, and 28 to 30, the process according to the invention includes reception 31 of parameters describing these texture faults of the product and of the object page, and due to the folds produced. These parameters are generated by the "image simulator," then furnished by the "image simulator" to the "3D simulator." The process according to the invention then includes an integration of these texture faults by the "3D simulator" into the face images before their coating on the faces of the object page. These texture faults correspond to folding after printing (numerous localizations), tears that occur, for example, on the nose of the cone, at the head of a section, at the foot of a section, faults associated with size (too loose, tears, etc.), stains, diverse and varied tasks. These texture faults are bitmap files that are combined with face images by various integration algorithms: addition, subtraction augmentation, diminution, mixing, etc., directly into the face images serving to texture "pages" of the finished product.

Then these two face images, reworked in this manner for adding texture faults, are used by the "3D simulator." The process according to the invention includes, in effect, a coating 32 of the image of the face associated with that face for each face of the three-dimensional object page. For each object page there are two texture bitmaps, one of which corresponds to the front and the other to the reverse side of the object page or the product.

Following the steps 10 to 13, 23, and 28 to 32, the process according to the invention also includes a construction 34 of the simulated product starting from the three-dimensional object page. During this construction 34 the three-dimensional object page is modified according to step 13, integrates the structural faults integrated at step 28, is provided with the mesh created in step 29, and includes the images plated in step 32. An image and display 36 on the monitor 5 of the simulated product are formed in this manner.

At this stage of the process, the structure of the three-dimensional object page is defined in the memory of unit 3, the texture bitmaps are plated on this object page, and it only remains to define the "form" of the product to be displayed as a function of a display mode selected by a user. This display 36 takes place in the following manner. The user selects the folds produced in sequential order (from the first fold to the last fold) and, by means of a series of graphical icons displayed on the monitor, the folds that he wishes to view folded on the monitor 5; this choice is supplied to the "3D simulator." The process according to and embodiment thus includes a reception 33 by the "3D simulator" of the selection of folds to be displayed among the folds produced; this choice is passed back to the level of the object page by the construction 34 of the simulated product to be displayed, this construction 34 including the rotations of the page object about the fold lines of the selected folds, in the folding direction defined for each of these lines. Then, the user provides the "3D simulator" with a point of view for the display of this three-dimensional object, among 2 predefined points of view, one of which is located perpendicular to the product on the front side, and the other located on the reverse side. The process according to an embodiment thus including a reception 35 by the "3D simulator" from a display point of view of the three-dimensional object. As a function of the point of view selected by the user, the "3D simulator" positions a "camera" (i.e., a point of view starting from which the 3D rendering will be calculated in OpenGL) by an OpenGL engine that thereby constructs a three-dimensional image simulating the folded product uniquely along the folds selected by the user, then this three-dimensional image is displayed on the monitor 5.

Figure 14:
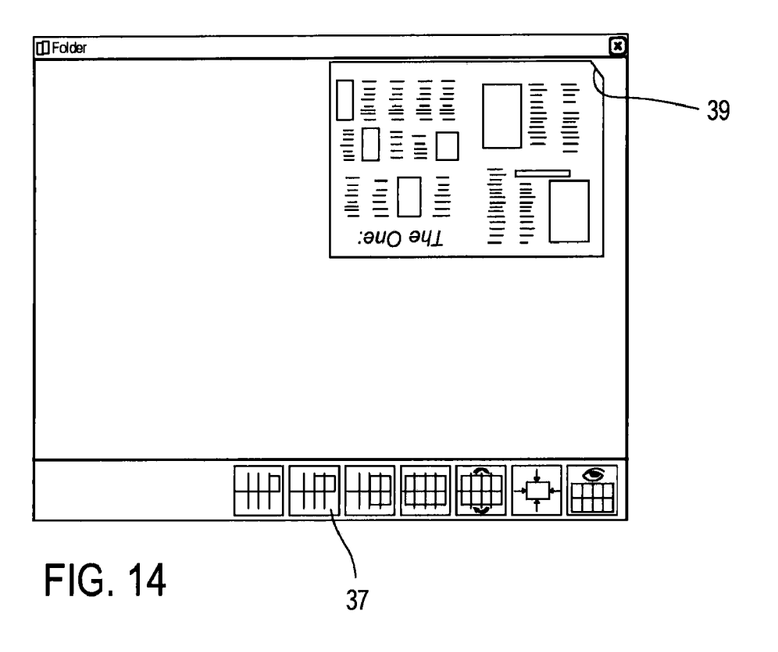
FIG. 14 and FIG. 15 show displays of a three-dimensional object page.
Figure 15:
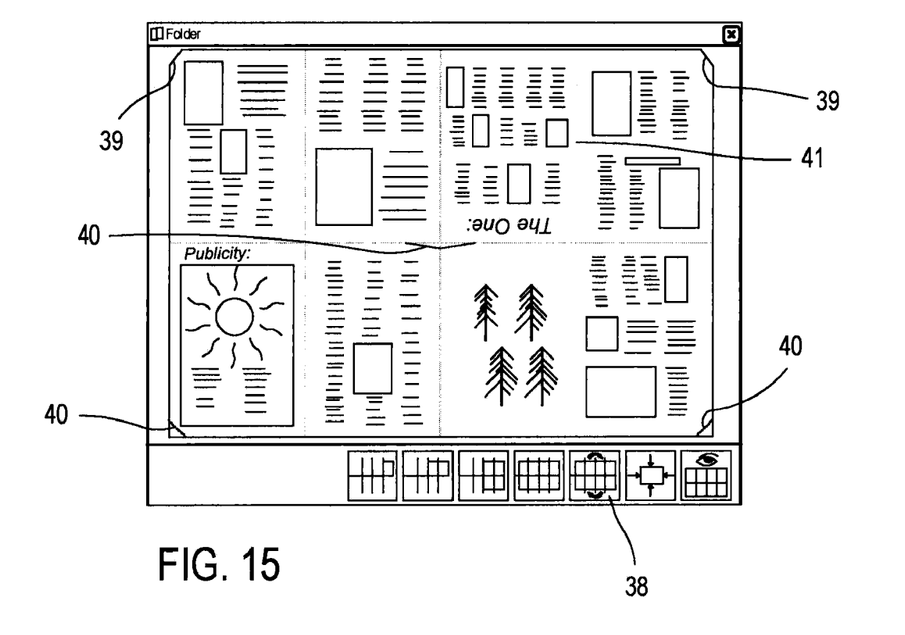

If one or more open folds are displayed (i.e., unfolded), these open folds are displayed in the texture of the simulated product in the form of fold lines 41. These lines 41 become part of the texture faults formerly integrated into the face images. FIGS. 14 and 15 show the display of the three-dimensional image in a display window on the monitor 5, for a sequence of folds including a conical fold, a first parallel fold, and a square fold. In the case of FIG. 14, the user has selected at least one icon 37 for uniquely unfolding the square fold. In the case of FIG. 15, the user has selected at least one icon 38 for uniquely unfolding the conical fold, the first parallel fold, and the square fold. The structural faults such as a dog-ear 39, and texture faults such as folds 40 are illustrated in FIGS. 14, 15.

The user can always choose to view the product centered in the display window, or in its "actual" place during folding or unfolding of the preceding fold. This only affects the position of the product in the OpenGL display window. All of the construction of the three-dimensional image and its final rendition in the display window are standard tasks carried out by the OpenGL engine starting from the previously described object page.

The invention, of course, not limited to the examples that have just been described, and numerous improvements can be made to these examples without exceeding the scope of the invention. In particular, the console 2 need not be real, but can be virtual and simulated by unit 3 and represented on a monitor. Furthermore, the API used by the "3D simulator" could be the DirectX API or any other three-dimensional graphical API.

What is claimed as new and desired to be protected by Letters Patent of the United States is:

1. A process for simulating a product printed by a press, the process comprising:
    creating a three-dimensional simulation of a page;
    selecting at least one fold among a set of predetermined folds, the selected folds corresponding to folds produced on the product to be simulated;
    for each of the selected folds, modifying the three-dimensional simulation by the addition of at least one fold line at a given position on the three-dimensional simulation,
    constructing a simulated product starting from the modified three-dimensional simulation, and
    displaying the simulated product on a display device.

2. A process according to claim 1, further comprising providing a sequence of folds produced.

3. A process according to claim 2, wherein, for at least one of the selected folds, the modification of the three-dimensional simulation depends on an order of the selected fold within the sequence of folds.

4. A process according to claim 3, wherein, for said at least one of the selected folds,
    (a) a number of fold lines to be added to the three-dimensional simulation,
    (b) the position of the fold lines on the three-dimensional simulation, and
    (c) a folding direction about the fold line depend on the order of the selected fold within the sequence of folds.

5. A process according to claim 1, further comprising providing a fold type for each of the folds produced, for the selection of the at least one fold.

6. A process according to claim 5, wherein, for each of the folds produced,
(a) a number of fold lines to be added to the three-dimensional simulation,
(b) the position of these fold lines on the three-dimensional simulation, and
(c) for each fold line, a folding direction about the fold line, depend on the type of the fold produced.

7. A process according to claim 1, further comprising providing folding fault parameters that describe structural faults related to each of the folds produced, and modifying the position of each of the fold lines of the three-dimensional simulation as a function of the folding fault parameters.

8. A process according to claim 7, wherein, for at least one fold line of the folding fault parameters, including parameters for shifting the at least one fold line by translation with respect to an optimal transverse or longitudinal position of the at least one fold line.

9. A process according to claim 7, wherein, for at least one fold line the folding fault parameters, including parameters for shifting the at least one fold line by rotation with respect to an optimal angular position of the at least one fold line.

10. A process according to claim 1, further comprising adding dog-ear lines at each corner of the three-dimensional simulation, of each junction between the fold lines and the edges of the three-dimensional simulation, and of each junction between the fold lines.

11. A process according to claim 1, wherein the three-dimensional simulation includes two faces, the process moreover including coating each face with an image associated with the face.

12. A process according to claim 11, further comprising integrating texture faults of the product due to the folds produced, and combining the texture faults with the images before coating the faces of the three-dimensional simulation.

13. A process according to claim 1, further comprising providing a point of view for displaying the product, said point of view preferably corresponding to a front side or reverse side of the product.

14. A process according to claim 1, further comprising providing folds to be displayed from among the folds produced.

15. A process according to claim 1, wherein the constructing the simulated product comprises
modifying the three-dimensional simulation to include structural faults based on received structural fault parameters describing folding errors of a virtual press,
creating a triangular mesh of the three-dimensional simulation,
creating respective face images for each face of the product to be simulated,
modifying the respective face images based on received texture fault parameters, and
coating the triangular mesh with the respective face images.

16. A device for simulating a product printed by a press, comprising:
a press console for controlling the press,
a processor configured to simulate the press, the processor configured to create a three-dimensional simulation of a page,
select at least one fold among a set of predetermined folds, with the selected folds corresponding to the folds produced by the press on the product to be simulated, and
modify the three-dimensional simulation by adding at least one fold line at a given position on the three-dimensional simulation for each fold produced and selected, and
construct a simulated product from the modified three-dimensional simulation, and
a display device that displays the simulated product.

17. A device according to claim 16, wherein the processor is configured to construct the simulated product by
modifying the three-dimensional simulation to include structural faults based on received structural fault parameters describing folding errors of a virtual press,
creating a triangular mesh of the three-dimensional simulation,
creating respective face images for each face of the product to be simulated,
modifying the respective face images based on received texture fault parameters, and
coating the triangular mesh with the respective face images.

18. A device for simulating a product printed by a press, comprising:
a press console to control the press, and
means for simulating the press comprising:
means for creating a three-dimensional simulation of an object page,
means for selecting at least one fold among a set of predetermined folds, with the selected folds corresponding to the folds produced by the press on the product to be simulated, and
means for modifying the three-dimensional simulation of the object page by adding at least one fold line at a given position on the three-dimensional simulation of the object page for each fold produced and selected,
means for constructing a simulated product from the modified three-dimensional simulation of the object page, and
means for displaying the simulated product.

19. A device according to claim 18, wherein the means for constructing the simulated product
modifies the three-dimensional simulation to include structural faults based on received structural fault parameters describing folding errors of a virtual press,
creates a triangular mesh of the three-dimensional simulation,
creates respective face images for each face of the product to be simulated,
modifies the respective face images based on received texture fault parameters, and
coats the triangular mesh with the respective face images.

* * * * *